(12) United States Patent
Carlstedt

(10) Patent No.: US 6,746,031 B2
(45) Date of Patent: Jun. 8, 2004

(54) SUSPENSION STRUCTURE AS ACCUMULATOR FOR VEHICLE AIR SYSTEMS

(75) Inventor: Robert P. Carlstedt, Rochester Hills, MI (US)

(73) Assignee: Meritor Light Vehicle Technology, LLC, Troy, MI (US)

( * ) Notice: Subject to any disclaimer, the term of this patent is extended or adjusted under 35 U.S.C. 154(b) by 0 days.

(21) Appl. No.: 09/977,660

(22) Filed: Oct. 15, 2001

(65) Prior Publication Data
US 2003/0071431 A1 Apr. 17, 2003

(51) Int. Cl.[7] .............................................. B60G 21/055
(52) U.S. Cl. ..................... 280/124.107; 280/124.157; 280/124.16; 280/782
(58) Field of Search ................... 280/124.134, 124.157, 280/124.16, 124.161, 782, 6.159; 267/64.11; 303/22.5

(56) References Cited

U.S. PATENT DOCUMENTS

| | | | | | |
|---|---|---|---|---|---|
| 2,558,562 | A | * | 6/1951 | Hutton ........................ | 180/234 |
| 2,742,301 | A | * | 4/1956 | Pointer ....................... | 280/683 |
| 2,901,241 | A | * | 8/1959 | Lautzenhiser et al. ...... | 267/186 |
| 2,902,291 | A | * | 9/1959 | Walker ..................... | 280/6.159 |
| 2,913,252 | A | * | 11/1959 | Norrie ...................... | 280/6.159 |
| 2,914,339 | A | * | 11/1959 | Gouirand ................... | 280/6.16 |
| 2,988,377 | A | * | 6/1961 | Papst .......................... | 280/782 |
| 3,008,729 | A | * | 11/1961 | Muller et al. ............. | 280/5.509 |
| 3,063,732 | A | | 11/1962 | Harbers et al. | |
| 3,573,883 | A | * | 4/1971 | Cadiou ..................... | 280/6.157 |
| 3,602,470 | A | * | 8/1971 | Reynolds ............. | 280/124.129 |
| 3,650,571 | A | * | 3/1972 | Chouings ..................... | 303/10 |
| 3,869,861 | A | * | 3/1975 | Case ........................... | 60/413 |
| 3,880,445 | A | | 4/1975 | Chieger | |
| 3,904,181 | A | * | 9/1975 | Harsy-Vadas ................ | 267/35 |
| 3,906,869 | A | * | 9/1975 | Dobson et al. ............. | 105/164 |
| 3,992,035 | A | * | 11/1976 | Dezelan et al. ............. | 280/683 |
| 4,007,801 | A | * | 2/1977 | Vincent et al. ............. | 180/342 |
| 4,030,580 | A | * | 6/1977 | Glaze ....................... | 188/266.5 |
| 4,143,925 | A | * | 3/1979 | Young ........................ | 303/22.5 |
| 4,433,872 | A | * | 2/1984 | Parker et al. ............... | 303/22.5 |
| 4,651,838 | A | * | 3/1987 | Hamilton et al. ........... | 177/209 |
| 4,717,170 | A | * | 1/1988 | Mounier-Poulat et al. .. | 280/683 |
| 4,930,807 | A | * | 6/1990 | Lachaize ................. | 280/5.505 |
| 5,102,161 | A | * | 4/1992 | Williams ................. | 280/6.159 |

(List continued on next page.)

FOREIGN PATENT DOCUMENTS

| | | | |
|---|---|---|---|
| DE | 40 21 176 A1 | * | 2/1991 |
| JP | 11-208234 | * | 3/1999 |

*Primary Examiner*—Paul N. Dickson
*Assistant Examiner*—Toan C To
(74) *Attorney, Agent, or Firm*—Carlson, Gaskey & Olds, P.C.

(57) ABSTRACT

An accumulator is provided for a vehicle air system including a vehicle frame. A wheel end is spaced from the frame for supporting the vehicle frame on a roadway. A suspension assembly includes a suspension structure. The suspension structure may be a portion of an axle, a stabilizer bar, a control arm, or other suspension components. The suspension structure is interposed between the frame and the wheel end and is movable relative to the vehicle frame in response to the wheel end receiving inputs from the roadway. A fluid chamber forms the accumulator and is defined by a portion of the suspension structure for storing pressurized air. Preferably a valve is disposed within the fluid chamber to protect the valve from the environment. For light vehicle applications where a conventional air pump may be cost prohibitive, a mechanical pump may be connected between the vehicle frame and the suspension assembly. The mechanical pump provides pressurized air to the fluid chamber in response to relative movement between the suspension assembly and the vehicle frame as the vehicle travels along the roadway.

2 Claims, 3 Drawing Sheets

U.S. PATENT DOCUMENTS

| | | | | |
|---|---|---|---|---|
| 5,152,547 A | * | 10/1992 | Davis | 280/5.512 |
| 5,269,556 A | * | 12/1993 | Heyring | 280/5.508 |
| 5,290,140 A | | 3/1994 | Henderson et al. | |
| 5,658,013 A | | 8/1997 | Bees et al. | |
| 5,769,400 A | * | 6/1998 | Holzl et al. | 267/64.16 |
| 5,785,344 A | * | 7/1998 | Vandewal et al. | 267/64.16 |
| 5,794,966 A | * | 8/1998 | MacLeod | 280/5.507 |
| 5,988,655 A | * | 11/1999 | Sakai et al. | 280/6.159 |
| 6,131,709 A | * | 10/2000 | Jolly et al. | 188/267.2 |
| 6,145,859 A | * | 11/2000 | Altherr et al. | 280/124.159 |
| 6,293,530 B1 | * | 9/2001 | Delorenzis et al. | 267/64.13 |
| 6,398,236 B1 | * | 6/2002 | Richardson | 280/86.5 |

\* cited by examiner

SUSPENSION STRUCTURE AS ACCUMULATOR FOR VEHICLE AIR SYSTEMS

BACKGROUND OF THE INVENTION

This invention relates to an accumulator for use in vehicle air systems, and more particularly, the invention relates to suspension structures used to form the accumulators.

Accumulators are used in vehicle applications to hold pressurized air for an air suspension and/or air brakes. The accumulator is constructed from a tank that is secured to a portion of the vehicle using straps or brackets. The tank must be accommodated or packaged in a portion of the vehicle along with numerous other vehicle components. A pump provides pressurized air to the tank for storage and later used by the air suspension and brakes. Air lines run from the accumulator to the various components requiring pressurized air. In particular, an air line is necessary from the accumulator to each air spring and each brake actuator. Because many air lines are used, which can be rather long, there may be pressure loss and time lag within the air system that negatively impacts the response time of the air suspension and brakes. Furthermore, a separate accumulator secured to the vehicle increases the weight and cost of the air system by requiring numerous components.

Components in a vehicle have been used to form air conduits that carry air from an air pump to an air system component such as an air spring. For example, a portion of a side rail frame has been partitioned to carry pressurized air from the pump to an air spring. Such conduits may be insufficient to hold pressurized air which is subsequently supplied to an air system component. Moreover, providing an air conduit in a portion of the frame presents problems with servicing the conduit. Therefore, what is needed is an accumulator that may be incorporated into a portion of the vehicle while providing a serviceable accumulator.

SUMMARY OF THE INVENTION AND ADVANTAGES

The present invention provides an accumulator for a vehicle air system including a vehicle frame. A wheel end is spaced from the frame for supporting the vehicle frame on a roadway. A suspension assembly includes a suspension structure. The suspension structure may be a portion of an axle, a stabilizer bar, a control arm, or other suspension components. The suspension structure is interposed between the frame and the wheel end and is movable relative to the vehicle frame in response to the wheel end receiving inputs from the roadway. A fluid chamber forms the accumulator and is defined by a portion of the suspension structure for storing pressurized air. Preferably a valve is disposed within the fluid chamber to protect the valve from the environment. For light vehicle applications where a conventional air pump may be cost prohibitive, a mechanical pump may be connected between the vehicle frame and the suspension assembly. The mechanical pump provides pressurized air to the fluid chamber in response to relative movement between the suspension assembly and the vehicle frame as the vehicle travels along the roadway.

Accordingly, the above invention provides an accumulator that may be incorporated into a portion of the vehicle while providing a serviceable accumulator.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENT

Figure 1:
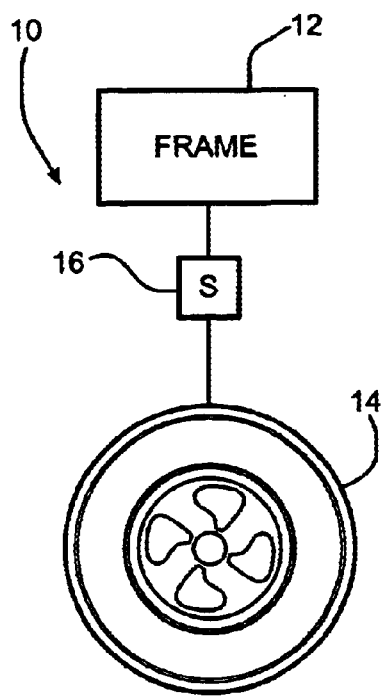
FIG. 1 is a schematic view of a vehicle chassis including the accumulator of the present invention.

A vehicle chassis 10 is shown schematically in FIG. 1. The vehicle chassis 10 includes a frame 12 and a wheel end 14 supporting the frame 12 on a wheel. The wheel end 14 may be a part of an axle assembly or a spindle. A suspension assembly 16 is arranged between the frame 12 and the wheel end 14 for receiving and dampening inputs transmitted from the roadway through the wheel end 14 during which the suspension assembly 16 moves relative to the vehicle frame 12. Suspension assemblies commonly includes such components as an axle, a cross member, a stabilizer bar, a control arm, and other similar suspension components.

Figure 2:
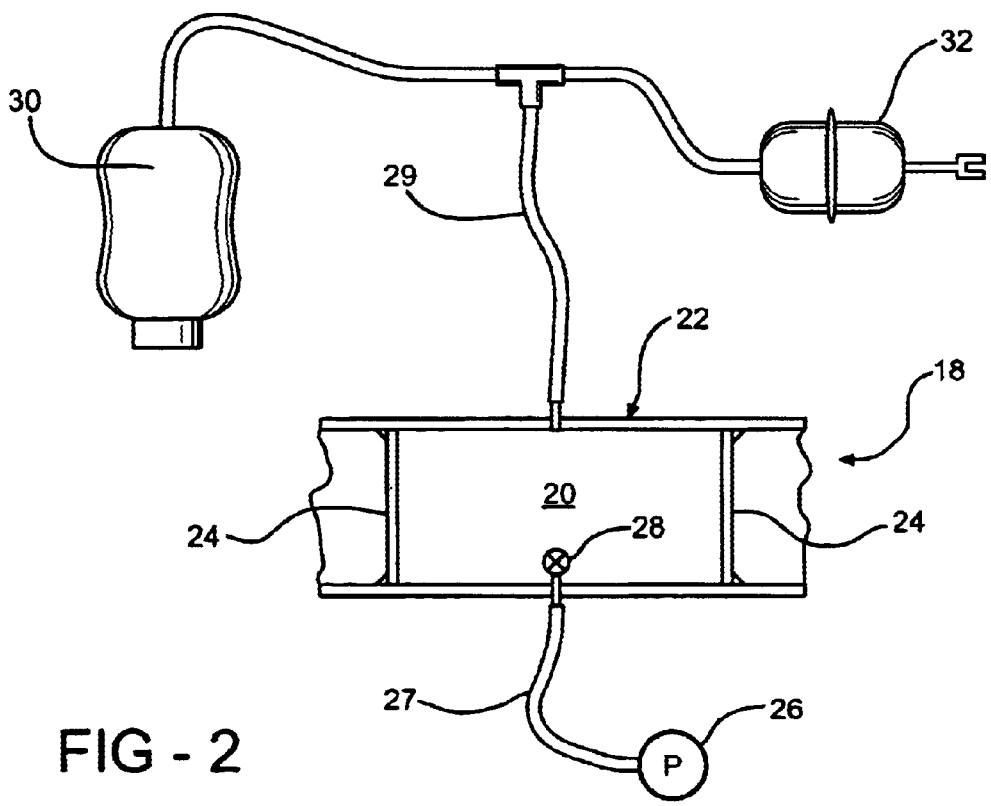
FIG. 2 is a schematic view of a portion of a suspension structure defining the accumulator of the present invention.
Figure 4A:
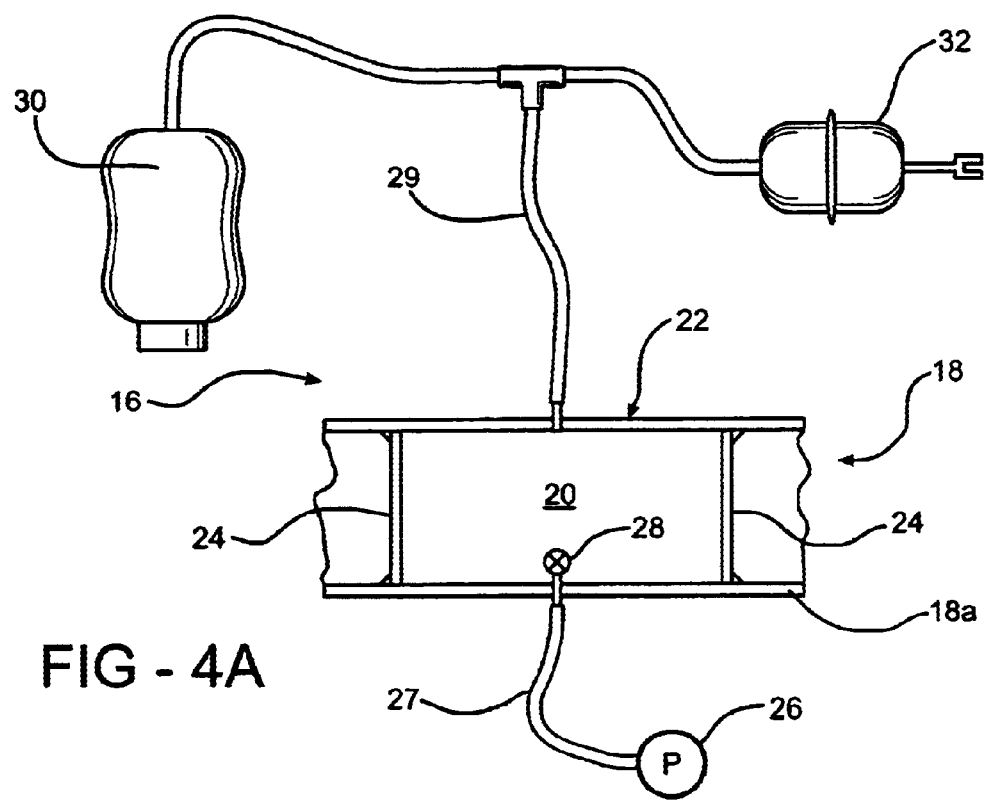
FIG. 4A is a schematic view of this invention incorporated into an axle.
Figure 4B:
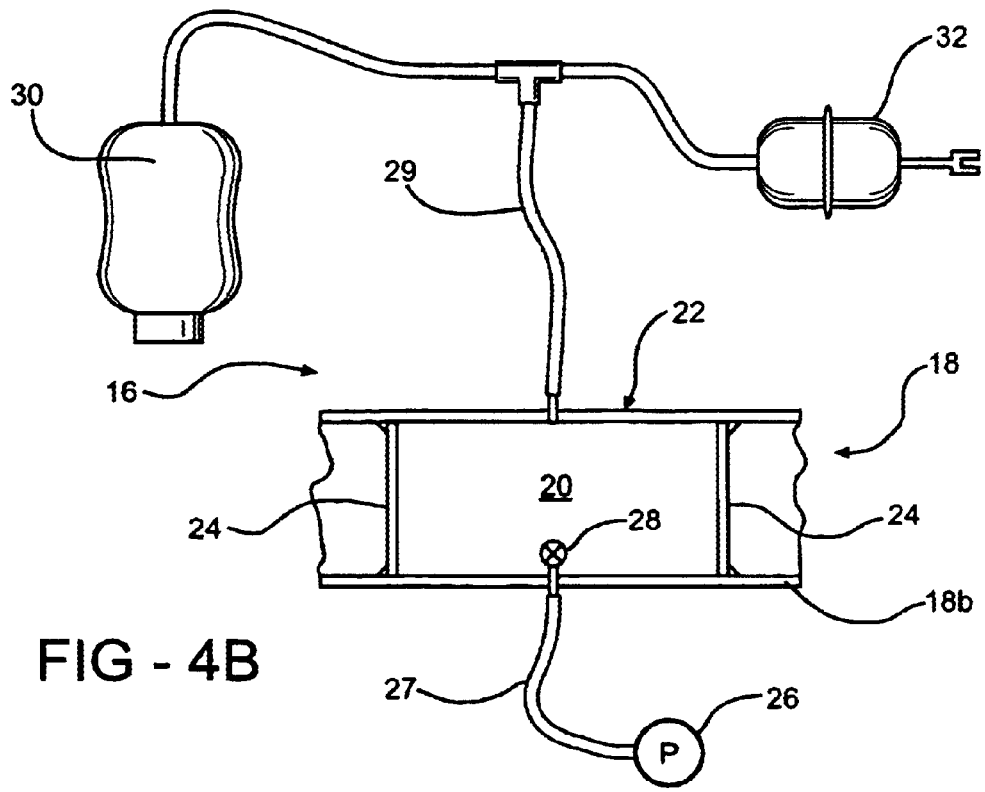
FIG. 4B is a schematic view of this invention incorporated into a cross member.
Figure 4C:
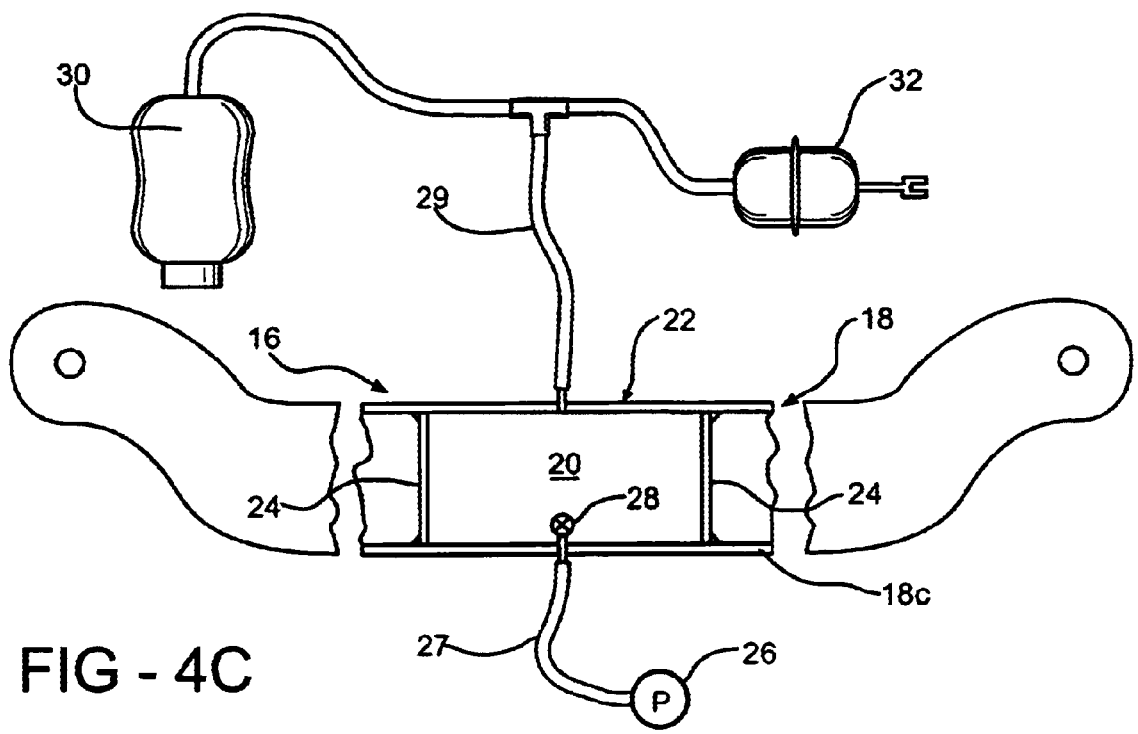
FIG. 4C is a schematic view of this invention incorporated into a stabilizer bar.
Figure 4D:
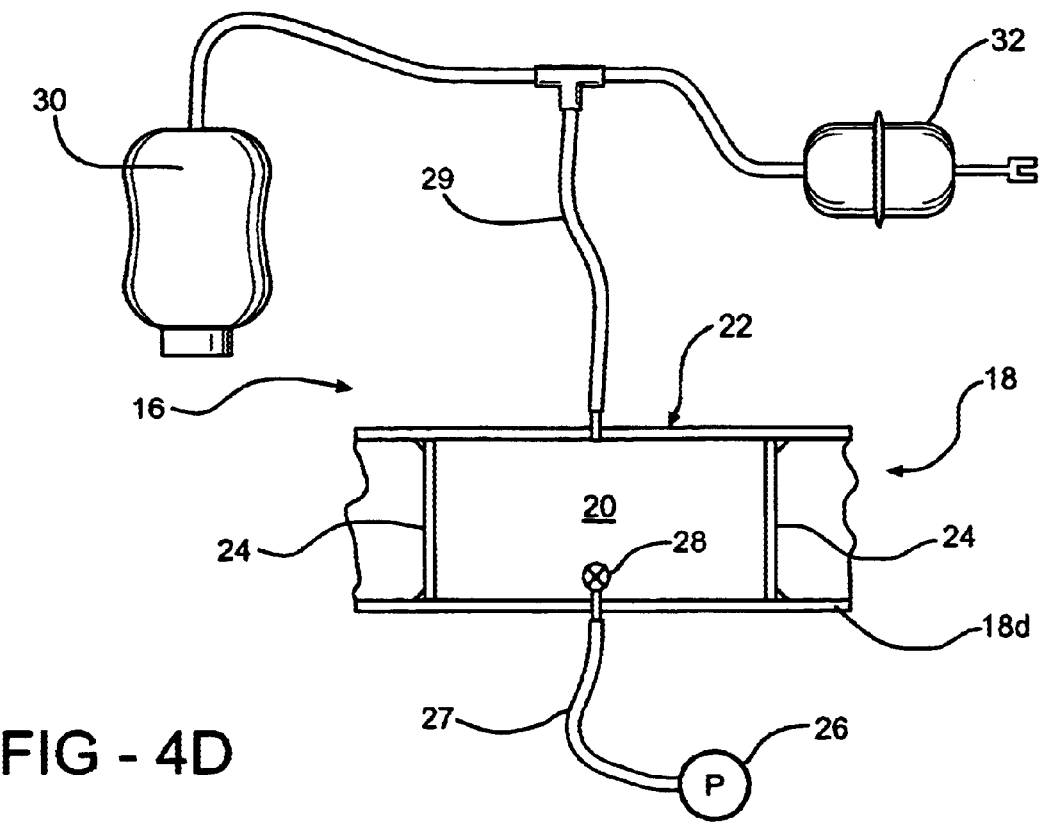
FIG. 4D is a schematic view of this invention incorporated into a control arm.

The suspension assembly 16 includes suspension structure 18, as shown in FIG. 2. The suspension structure 18 is a portion of a suspension component such as a portion of an axle 18a (FIG. 4A), a cross member 18b (FIG. 4B), a stabilizer bar 18c (FIG. 4C), a control arm 18d (FIG. 4D), or other similar suspension components. A portion of the suspension structure 18 may be formed or partitioned to form a fluid chamber 20 and provide an accumulator 22, which holds pressurized air. Partition walls 24 may be welded to the suspension structure 18 to fully enclose the fluid chamber 20. Air pump 26 is connected to the accumulator 22 by an air line 27. A valve 28 may be received within the fluid chamber 20 to protect the valve 28 from the environment. Pressurized air exits the accumulator 22 through air line 29, which is connected to an air system component such as an air spring 30 and/or an air brake actuator 32.

The accumulator 22 of the present invention is constructed from a suspension structure 18 to reduce the length of the air lines 27 and 29 and to locate the accumulator 22 closer to the air system components to reduce the effects of pressure loss and response time lag. To further improve the response time of the air suspension components, numerous accumulators 22 may be used, that is, more than one suspension component may be used to form the accumulators 22 of the present invention. The suspension components are much smaller as compared to a vehicle frame. As a result, the air chamber 20 of the present invention is relatively serviceable.

Figure 3:
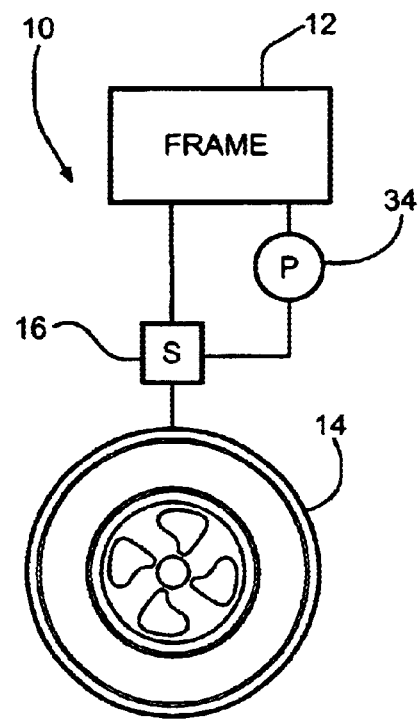
FIG. 3 is a schematic view of another embodiment of a vehicle chassis having the present invention accumulator.

Another embodiment of the vehicle chassis 10 of the present invention is shown in FIG. 3. Light vehicle applications such as trailers for boats, motorcycles, and the like, typically cannot justify the expense of an air suspension system due to the additional cost of the compressor, related lines, valves, and controls. A mechanical pump 34 may be arranged between the vehicle frame 12 and the suspension assembly 16 and is of the type that pumps air in response to movement. One end of the pump 34 is connected to frame 12 and the other end is connected to the suspension assembly. The mechanical pump 34 utilizes the relative movement between the suspension assembly 16 and the vehicle frame 12 to provide pressurized air to the fluid chamber 20. In this manner, an inexpensive air system may be provided for light duty applications that would otherwise be cost prohibitive.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A suspension arrangement comprising a stabilizer bar including a fluid chamber forming an accumulator defined by a portion of said stabilizer bar for storing pressurized air.

2. A suspension arrangement comprising:

a vehicle frame;

a wheel support spaced from said vehicle frame having a wheel mounted thereto for supporting said vehicle frame on roadway;

a suspension assembly including a suspension structure interconnected between said vehicle frame and said wheel support, said suspension structure moveable relative to said vehicle frame in response to said wheel support receiving inputs from the roadway, a portion of said suspension structure forming an accumulator having a fluid chamber for storing pressurized air, wherein said suspension structure is a stabilizer bar; and a mechanical pump interconnected between said vehicle frame and said suspension assembly providing pressurized air to said fluid chamber in response to relative movement between said suspension assembly and said vehicle frame.

* * * * *